United States Patent
Chen et al.

(10) Patent No.: US 11,937,064 B2
(45) Date of Patent: *Mar. 19, 2024

(54) METADATA-PRESERVED AUDIO OBJECT CLUSTERING

(71) Applicant: Dolby Laboratories Licensing Corporation, San Francisco, CA (US)

(72) Inventors: Lianwu Chen, Beijing (CN); Lie Lu, Dublin, CA (US); Nicolas R. Tsingos, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,184

(22) Filed: May 5, 2022

(65) Prior Publication Data
US 2022/0272474 A1  Aug. 25, 2022

Related U.S. Application Data

(63) Continuation of application No. 15/535,398, filed as application No. PCT/US2015/065023 on Dec. 10, 2015, now Pat. No. 11,363,398.
(Continued)

(30) Foreign Application Priority Data

Dec. 11, 2014  (CN) .......................... 201410765578.6

(51) Int. Cl.
| | | |
|---|---|---|
| H04S 3/00 | (2006.01) | |
| G06F 18/2321 | (2023.01) | |
| H04S 7/00 | (2006.01) | |

(52) U.S. Cl.
CPC ................ *H04S 3/008* (2013.01); *H04S 7/30* (2013.01); *G06F 18/2321* (2023.01);
(Continued)

(58) Field of Classification Search
CPC ........ H04S 3/008; H04S 7/30; H04S 2400/01; H04S 2400/09; H04S 2400/11; H04S 2420/03; G06K 9/6226
See application file for complete search history.

(56) References Cited

U.S. PATENT DOCUMENTS

| 7,356,465 B2 | 4/2008 | Tsingos |
|---|---|---|
| 8,363,865 B1 | 1/2013 | Bottum |

(Continued)

FOREIGN PATENT DOCUMENTS

| CN | 102100088 | 6/2011 |
|---|---|---|
| CN | 102982804 | 3/2013 |

(Continued)

OTHER PUBLICATIONS

Beritelli, F. et al."A Pattern Classification Proposal for Object-Oriented Audio Coding in MPEG-4" published Sep. 1998, pp. 375-391.

(Continued)

*Primary Examiner* — Fan S Tsang
*Assistant Examiner* — David Siegel

(57) ABSTRACT

Example embodiments disclosed herein relate to audio object clustering. A method for metadata-preserved audio object clustering is disclosed. The method comprises classifying an audio object into at least a category based rendering mode information metadata. The method further comprises assigning a predetermined number of clusters to the categories and rendering the audio object based on the rendering mode. Corresponding system and computer program product are also disclosed.

3 Claims, 2 Drawing Sheets

Related U.S. Application Data

(60) Provisional application No. 62/100,183, filed on Jan. 6, 2015.

(52) U.S. Cl.
CPC ....... *H04S 2400/01* (2013.01); *H04S 2400/09* (2013.01); *H04S 2400/11* (2013.01); *H04S 2420/03* (2013.01)

(56) References Cited

U.S. PATENT DOCUMENTS

| | | | |
|---|---|---|---|
| 8,463,413 | B2 | 6/2013 | Oh |
| 9,564,138 | B2 | 2/2017 | Oh |
| 2008/0065659 | A1 | 3/2008 | Watanabe |
| 2010/0223265 | A1 | 9/2010 | Fogel |
| 2012/0195433 | A1 | 8/2012 | Eppolito |
| 2014/0023196 | A1 | 1/2014 | Xiang |
| 2014/0023197 | A1* | 1/2014 | Xiang .................. G10L 19/008 381/17 |
| 2014/0025386 | A1* | 1/2014 | Xiang ..................... G10L 19/00 704/500 |
| 2015/0332680 | A1 | 11/2015 | Crockett |
| 2016/0192105 | A1 | 6/2016 | Breebaart |
| 2016/0212559 | A1 | 7/2016 | Mateos Sole |
| 2016/0337776 | A1 | 11/2016 | Breebaart |

FOREIGN PATENT DOCUMENTS

| | | |
|---|---|---|
| CN | 103460288 | 12/2013 |
| CN | 103650539 B | 3/2014 |
| JP | 2006508390 | 3/2006 |
| JP | 2008070959 | 3/2008 |
| JP | 2009511980 | 3/2009 |
| JP | 2010521013 A | 6/2010 |
| JP | 2013093840 | 5/2013 |
| JP | 2014222853 | 11/2014 |
| RU | 2376654 | 12/2009 |
| WO | 2013006338 A2 | 1/2013 |
| WO | 2013142657 A1 | 9/2013 |
| WO | 2014015299 | 1/2014 |
| WO | 2014021588 | 2/2014 |
| WO | 2014025752 | 2/2014 |
| WO | 2014099285 | 6/2014 |
| WO | 2014147442 | 9/2014 |
| WO | WO-2014147442 A1 * | 9/2014 ........... G10L 21/028 |
| WO | 2014184706 | 11/2014 |
| WO | 2014187991 | 11/2014 |

OTHER PUBLICATIONS

Deepayan C. et al., "Evolutionary clustering", Proceedings of the Twelfth ACM Sigkdd International Conference on Knowledge Discovery and Data Mining, Aug. 20-23, 2006, Philadelphia PA, USA, Jan. 1, 2006, p. 554, XP055266897.

Reidmiller J. et al., "Immersive & Personalized Audio: A Practical System for Enabling Interchange, Distribution & Delivery of Next Generation Audio Experiences", SMPTE Motion Imaging Journal, vol. 124, Oct. 21, 2014, pp. 1-23, XP055249950. "Personalized Audio" to "Simplifying immersive (object-based) programing", pp. 3-15.

Sugar, Catherine A. et al."Finding the No. of Clusters in a Dataset: Journal of the American Statistical Association" vol. 98, No. 463, pp. 750-763, Sep. 30, 2003.

Tsingos N., "Breaking the 64 spatialized sources barrier" http://hal.inria.fr/docs/00/60/67/39/PDF/ntsingos_gamasutra2.pdf.

Tsingos N., "Perceptual audio rendering of complex virtual environments" http://hal.inria.fr/docs/00/60/72/11/PDF/TsingosSiggraph01_1.pdf.

Wactlar, H. et al."Digital Video Archives: Managing Through Metadata" Computer Science Department, Apr. 30, 2002, Strategy for Digital Preservation: Issues in Digital Media Archiving.

Zhexue H., "Clustering Large Data sets with Mixed Numeric and Categorical Values", Proceedings of the 1st Pacific-Asia Conference on the Knowledge Discovery and Data Mining (PAKDD) Feb. 24, 1997, pp. 21-34, XP055266860.

* cited by examiner

METADATA-PRESERVED AUDIO OBJECT CLUSTERING

CROSS-REFERENCE TO RELATED APPLICATIONS

This application is a continuation of U.S. patent application Ser. No. 15/535,398, filed 2017 Jun. 12, which is a US 371 Application No. PCT/US2015/065023, filed on 10 Dec. 2015, which claims the benefit of priority to Chinese Patent Application No. 201410765578.6 filed 11 Dec. 2014 and U.S. Provisional Patent Application No. 62/100,183 filed 6 Jan. 2015, the contents of each are hereby incorporated by reference in their entirety.

TECHNOLOGY

Example embodiments disclosed herein generally relate to audio content processing, and more specifically to a method and system for audio object clustering which allows metadata to be preserved.

BACKGROUND

The advent of object-based audio has significantly increased the amount of audio data and the complexity of rendering this data within high-end playback systems. For example, cinema sound tracks may comprise many different sound elements corresponding to images on the screen, dialogs, noises, and sound effects that emanate from different places on the screen and those sound tracks also are combined with background music and ambient effects to create an overall auditory experience. Accurate playback requires that the sounds are reproduced in a way that corresponds as closely as possible to what is shown on the screen with respect to the position, intensity, movement, and depth of the sound source. Object-based audio represents a significant improvement over traditional channel-based audio systems that send audio content in the form of speaker feeds to individual speakers in a listening environment and are thus relatively limited with respect to the spatial playback of specific audio objects.

The introduction of digital cinema and the development of three-dimensional ("3D") content have created new standards for sound, such as the incorporation of multiple channels of audio to allow greater creativity for content creators, and a more enveloping and realistic auditory experience for audiences. It is critical to expand beyond the traditional speaker feeds and channel-based audio as a means for distributing spatial audio. Moreover, there has been considerable interest in a model-based audio description that allows a listener to select a desired playback configuration with the audio rendered specifically for the chosen configuration. The spatial presentation of sound utilizes audio objects which are audio signals with associated parametric source descriptions, such as apparent source position (e.g., 3D coordinates), apparent source width, and other parameters. Further advancements include a next generation spatial audio (also referred to as "adaptive audio") format that has been developed by including a mix of audio objects and traditional channel-based speaker feeds (audio beds) along with the positional metadata for the audio objects.

As used herein, the term "audio object" refers to an individual audio element that exists for a defined duration of time in the sound field. The term "audio bed" or "bed" refers to audio channels that are meant to be reproduced in predefined and fixed speaker locations.

In some soundtracks, there may be several (e.g., 7, 9, or 11) bed channels containing audio. Additionally, based on the capabilities of an authoring system, there may be tens or even hundreds of individual audio objects that are combined during rendering to create a spatially diverse and immersive audio experience. In other distribution and transmission systems, there may be an available bandwidth large enough to transmit all audio beds and objects with little or no audio compression. In some cases, however, such as Blu-ray disc, broadcast (cable, satellite and terrestrial), mobile (3G and 4G) and over-the-top (OTT, or Internet) distribution, there may be significant limitations on the available bandwidth to digitally transmit all of the bed and object information created at the time of authoring. While audio coding methods (lossy or lossless) may be applied to the audio to reduce the required bandwidth, audio coding may not be sufficient to reduce the bandwidth required to transmit the audio, particularly over very limited networks, such as mobile 3G and 4G networks.

Some prior methods have been developed to reduce the number of objects input into a smaller set of output objects by means of clustering. Generally in some clustering processes, metadata such as size, zone mask, and snap should be pre-rendered to an internal channel layout. The clustering of audio objects is only based on spatial position of audio objects, and the output objects only contain the positional metadata. This kind of output objects may not work well for some reproduced systems, since the loss of metadata may violate the expected artistic intent.

The subject matter discussed in the background section should not be assumed as the prior art merely due to its disclosure in the background section. Similarly, a problem mentioned in the background section or associated with the subject matter of the background section should not be assumed to have been previously recognized in the prior art. The subject matter in the background section merely represents different approaches, which in and of themselves may also be example embodiments.

SUMMARY

In order to address the foregoing and other potential problems, example embodiments proposes a method and system for metadata-preserved audio object clustering.

In one aspect, example embodiments provide a method for metadata-preserved audio object clustering. The method includes classifying a plurality of audio objects into a number of categories based on information to be preserved in metadata associated with the plurality of audio objects. The method further includes assigning a predetermined number of clusters to the categories and allocating an audio object in each of the categories to at least one of the clusters according to the assigning. Embodiments in this regard further include a corresponding computer program product.

In another aspect, example embodiments provide a system for metadata-preserved audio object clustering. The system includes an audio object classification unit configured to classify a plurality of audio objects into a number of categories based on information to be preserved in metadata associated with the plurality of audio objects. The system further includes a cluster assignment unit configured to assign a predetermined number of clusters to the categories and an audio object allocation unit configured to allocate an audio object in each of the categories to at least one of the clusters according to the assigning.

Through the following description, it would be appreciated that in accordance with the example embodiments disclosed herein, input audio objects are classified into corresponding categories depending on their information to be preserved in metadata, so that different metadata to be preserved or a unique combination of metadata to be preserved is associated with a different category. After clustering, for an audio object within one category, it is less possible that it is mixed with audio objects associated with different metadata. In this regard, metadata of audio objects can be preserved after clustering. Other advantages achieved by the example embodiments will become apparent through the following descriptions.

DESCRIPTION OF DRAWINGS

Through the following detailed description with reference to the accompanying drawings, the above and other objectives, features and advantages of embodiments will become more comprehensible. In the drawings, several example embodiments will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
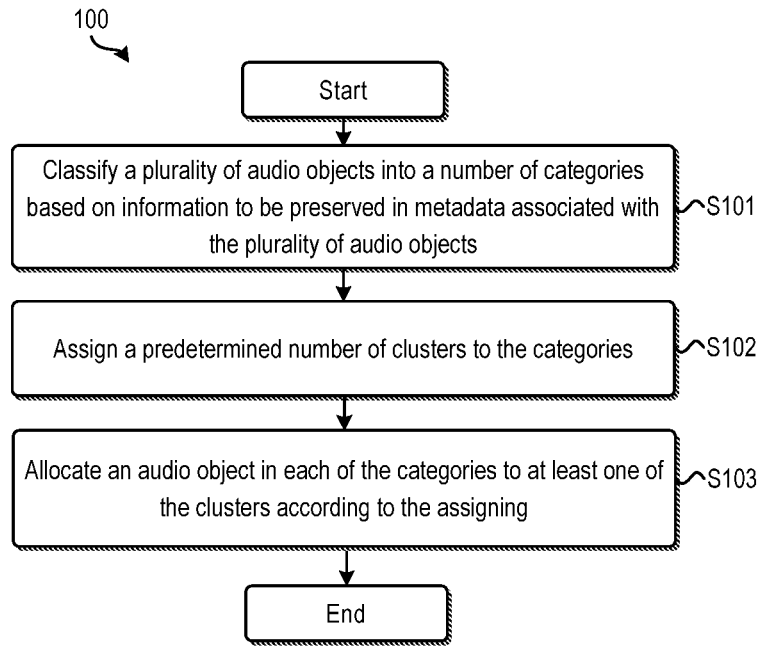
FIG. 1 illustrates a flowchart of a method for metadata-preserved audio object clustering in accordance with an example embodiment.

Principles of the example embodiment will now be described with reference to various example embodiments illustrated in the drawings. It should be appreciated that the depiction of these embodiments is only to enable those skilled in the art to better understand and further implement the example embodiments; it is not intended for limiting the scope in any manner.

As mentioned above, due to the limit in coding/decoding rate and transmission bandwidth, the number of audio objects used to produce adaptive audio content may be reduced by means of clustering. Besides the metadata describing its spatial position, an audio object usually has other metadata describing its attributes, such as size, zone masks, snap, and type of content, etc., each of which describes an artistic intent about how the audio object should be processed when it is rendered. However, in some prior methods, after audio objects are clustered, only positional metadata remains. Although other metadata may be pre-rendered to an internal channel layout, such as in a 7.1.2 or 7.1.4 system, it does not work well for all systems. Especially when the audio objects are down-mixed to, for example, a 5.1 or 7.1 system, artistic intents of the audio objects may be violated when rendered.

Take metadata "zone mask" as an example, which has multiple modes and each mode defines a region to which an audio object should not be rendered. One mode of zone mask is "no sides", describing that side speakers should be masked when rendering the audio object. By utilizing the traditional clustering method, if an audio object at a spatial position z=1 is rendered to a 5.1 system with metadata "no sides", the side speakers may be activated in 5.1 rendering, since the sound at the ceiling speakers may be folded to the sides. This violates the original artistic intent. In order to address this issue, the metadata "zone mask" in the clustering process should be preserved so that it can be correctly processed in an audio renderer.

In another example, dialog objects may be expected to be separated from other objects after clustering, which may have many benefits for subsequent audio object processing. For example, in subsequent audio processing such as dialog enhancement, separated dialog object clusters can be easily enhanced by simply applying a gain/gains. Otherwise, it may be very difficult to separate a dialog object if it is mixed with other objects in a cluster. In the application of dialog replacement, dialog in each language may be completely separated from each other. For those purposes, dialog objects should be preserved and allocated into separated specific clusters in the clustering process.

Further, an audio object may be associated with metadata describing its rendering mode, for example, rendering as left total/right total (Lt/Rt) or as binaural with a head related transfer function (HRTF) when processing in a headphone renderer. These rendering modes are also expected to be preserved after clustering in order to generate the best rendering results.

Therefore, to achieve better audio experience, it is desired to have metadata preserved in audio object clustering. Example embodiments disclosed herein propose a method and system for metadata-preserved object clustering.

Reference is first made to FIG. 1 which depicts a flowchart of a method 100 for metadata-preserved audio object clustering in accordance with example embodiments.

At S101, a plurality of audio objects are classified into a number of categories based on information to be preserved in metadata associated with the plurality of audio objects. The audio objects are provided as an input, and there may be tens, hundreds, or sometimes thousands of input audio objects.

As used herein, the information to be preserved in metadata associated with each audio object may indicate a processing intent when the audio object is rendered. The information may describe how the audio object should be processed when it is rendered. In some embodiments, the information may include one or more of size information, zone mask information, snap information, type of content, or a rendering mode of an audio object. The size information may be used to indicate a spatial area or volume occupied by an audio object. The zone mask information indicates a mode of zone mask, defining a region to which an audio object should not be rendered. For example, the zone mask information may indicate a mode of "no sides", "surround only", "front only", or the like. The snap information indicates whether or not an audio object should be directly panned to the nearest speaker.

It should be noted that some examples of information to be preserved in metadata are described and other information included in the metadata (such non-limiting examples include spatial position, spatial width, and the like) may also be considered in the audio object classification, according to preference of the user or audio engineer. In some embodiments, all information in metadata associated with an audio object may be considered.

The number of categories may be dependent on the information in metadata of the audio objects and may be larger than or equal to one. In one embodiment, an audio object without the information to be preserved may be classified into one category and an audio object with different information to be preserved may be classified into a different category. That is, depending on different information to be preserved, corresponding audio objects are classified into different categories. Alternatively, a category may represent a unique combination of different information to be preserved in metadata. All other audio objects without the information of interest may be contained in one category or multiple categories in some cases. The scope of the example embodiments are not limited in this regard.

The categories may be given by manual assignment, automatic assignment, or a combination thereof. For example, a user or an audio engineer may label audio objects associated with different kind of metadata by different flags and then those labeled audio objects may be classified into different categories according to their flags. For another example, the information to be preserved in metadata may be automatically identified. The user or audio engineer may also preconfigure their preference or expectation, such as separating dialog objects, separating different dialog languages, and/or separating different modes of zone mask. According to the pre-configuration, the audio objects may be classified to different categories.

Assume that there are O audio objects. In the classifying process, the information to be preserved in metadata of audio objects may be derived from (1) manual labels of metadata provided by user input, such as labels of zone mask or snap or content type or language, and/or (2) automatic identification/labeling of metadata, such as but not limited to, identification of the content type. The number N of possible categories may be determined according to the derived information, each consisting of a unique combination of information to be preserved. After classifying, each audio object may have associated category identification $n_o$.

Figure 2:
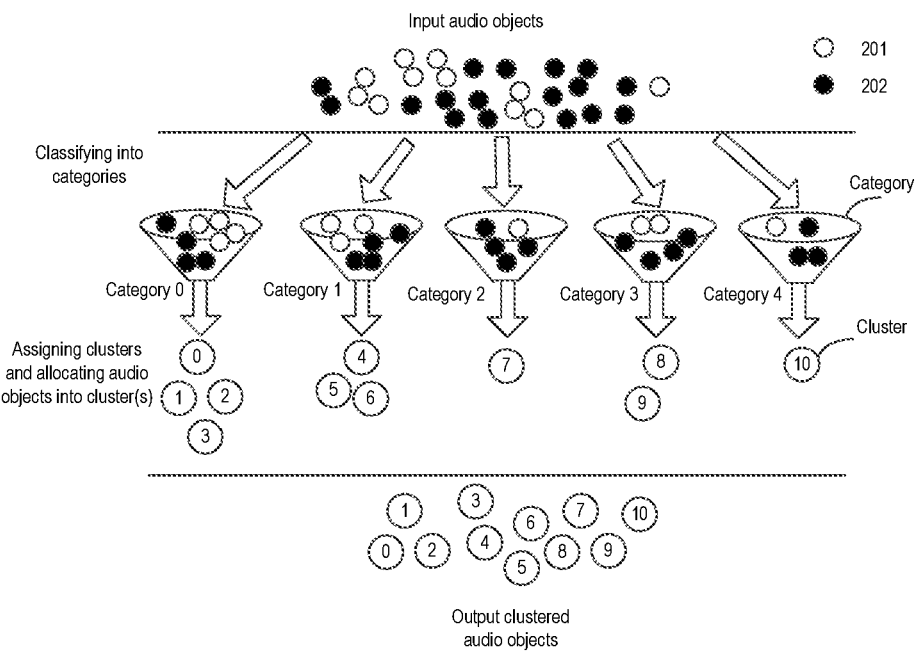
FIG. 2 illustrates a schematic diagram for an audio object clustering process in accordance with an example embodiment.

With reference to FIG. 2, a schematic diagram of audio object clustering is illustrated. As shown in FIG. 2, based on the information to be preserved in metadata, a plurality of input audio objects are classified into five categories, Categories 0 to 4. One example of the categories may be given as below:

Category 0: All audio objects without the information to be preserved;
Category 1: Music objects, no zone mask;
Category 2: Sound effect objects, with zone mask "surround only;"
Category 3: English dialog objects; and
Category 4: Spanish dialog objects, with zone mask "front only."

The input audio objects may include one or more frames. A frame is a processing unit for audio content and the duration of a frame may be varied and may depend on the configuration of the audio processing system. As the audio objects to be classified may be varied for different frames in time and their metadata may also be varied, the value of the number of categories may also change over time. The categories representing different kinds of information to be preserved may be predefined by the user or by default and input audio objects in one or more frames may then be classified into the predetermined categories based on the information. The categories with audio objects classified may be considered and those without audio objects may be ignored in subsequent processing. For example, when there is no audio object without the information to be preserved in FIG. 2, the corresponding Category 0 may be omitted. It is contemplated that the number of audio objects classified in each category may change over time.

At S102, a predetermined number of clusters are assigned to the categories. The predetermined number may be larger than one and may be dependent on the transmission bandwidth and a coding/decoding rate of the audio processing system. There may be a tradeoff between the transmission bandwidth (and/or the coding rate, and/or the decoding rate) and error criterion of the output audio objects. For example, the predetermined number may be 11 or 16. Other values also may be determined, such as 5, 7, or 20, and the scope of the example embodiments are not limited in this regard.

In some embodiments, the predetermined number may not be varied within the same processing system. In some other embodiments, the predetermined number may be varied for different audio files to be processed.

In example embodiments disclosed herein, audio objects are first classified into categories according to the metadata at S101, such that each category may represent different information to be preserved or a unique combination of different information to be preserved. Then audio objects in those categories may be clustered in subsequent processing. There may be various approaches to assign/allocate the predetermined overall number of clusters to the categories. In some example embodiments, since the overall number of clusters is predetermined and fixed, it is possible to determine the number of clusters to be assigned to each category before clustering the audio objects. Some example embodiments will now be discussed.

In one example embodiment, cluster assignment may be dependent on the importance of the plurality of audio objects. In particular, the predetermined number of audio objects from the plurality of audio objects first may be determined based on the importance of each audio object relative to other audio objects and then distribution of the predetermined number of audio objects among the categories may be determined. The predetermined number of clusters are correspondingly assigned to the categories according to the distribution.

The importance of each audio object may be associated with one or more of the types of content, partial loudness level, or energy level of the audio object. An audio object with a great importance may represent that the audio object is perceptually salient among the input audio objects, for example, because of its partial loudness or energy level. In some use cases, one or more types of content may be regarded as important, and then their great importance may be given to corresponding audio objects. For example, a greater importance may be assigned to dialog objects. It should be noted that there are many other ways to determine or define the importance of each audio object. For example, the importance level of some audio objects may be specified by users. The scope of the example embodiments are not limited in this regard.

Assume that the predetermined overall cluster number is M. In a first step, up to M audio objects that are most important among the input audio objects are selected. As all input audio objects are classified into corresponding categories in S101, in a second step, distribution of the M most important audio objects among the categories may be determined. Based on how many of the M audio objects are distributed in a category, the equal number of clusters may be assigned to the category.

With reference to FIG. 2, for example, eleven of the most important audio objects (illustrated as circle 201) are determined from a plurality of input audio objects (illustrated as a collection of circles 201 and 202). After classifying all input audio objects into the five categories, Categories 0 to 4, it can be seen from FIG. 2 that four most important audio objects are classified into Category 0, three most important audio objects are classified into Category 1, one most important audio object is classified into Category 2, two most important audio objects are classified into Category 3, and one most important audio object is classified into Category 4. It results in that 4, 3, 1, 2, and 1 clusters are respectively assigned to Categories 0 to 4, as shown in FIG. 2.

It should be noted that the above described example of an importance criterion in accordance with the example embodiment of the example embodiments may not be that strict. That is, it is not necessary that the most important audio objects are selected. In some embodiments, an importance threshold may be configured. Among those audio objects whose importance is higher than the threshold, the predetermined number of audio objects may be selected randomly.

Besides the importance criterion, cluster assignment may be performed based on reducing an overall spatial distortion for the categories. That is, the predetermined number of clusters may be assigned to the categories based on reducing or even minimizing an overall spatial distortion for the categories.

In one example embodiment, the overall spatial distortion for the categories may include a weighted sum of individual spatial distortions of the categories. The weight of the corresponding category may represent importance of the category or importance of the information to be preserved associated with the category. For example, a category with a greater importance may have a larger weight. In another embodiment, the overall spatial distortion for the categories may include a maximum spatial distortion among individual spatial distortions of the categories. It should be contemplated that it is not necessary that only the maximum is selected, and in some embodiments, other spatial distortions among the categories, such as the second largest spatial distortion, the third largest spatial distortion, or the like, may be regarded as the overall spatial distortion.

The spatial distortion for each category may be represented by the distortion level of audio objects included in the category and the distortion level of each audio object may be measured by the difference between its original spatial position and its position after being clustered. Generally the clustered position of an audio object is dependent on the spatial position of the cluster(s) where it is allocated. In this sense, the spatial distortion for each category is associated with the original spatial position of each audio object in the category, and the spatial position of the cluster(s). The original spatial position of an audio object may be contained in the metadata of the audio object and may, for example, consist of 3 Cartesian coordinates (or similarly for example, consisting of polar coordinates or cylindrical and spherical coordinates, homogenous coordinates, line number coordinates and the like). In one embodiment, to calculate the spatial distortion for each category, a reconstructed spatial position of each audio object in the category may be determined based on the spatial position of the cluster(s). Then, the spatial distortion for each category may be calculated based on a distance between the original spatial position of each audio object in the category and the reconstructed spatial position of the audio object. The reconstructed spatial position of the audio object is a spatial position of the audio object represented by one or more corresponding spatial clusters. One example approach of determination of the reconstructed spatial position will be described below.

The spatial distortion with regard to different cluster numbers may first be calculated for each category in order to obtain the overall spatial distortion. There are many approaches to determine the spatial distortion for a category of audio objects. One approach is given as example below. It should be noted that other existing ways to measure spatial distortions of the audio objects (and thus of the categories) may be applied.

Assume that for a category n, there are $M_n$ cluster centroids, denoting $\{C_n(1), C_n(2), \ldots, C_n(M_n)\}$ with spatial position $\{\vec{p}_{n,1}, \vec{p}_{n,2}, \ldots, \vec{p}_{n,M_n}\}$ dis($o_n(i)$, $\{C_n(1), C_n(2), \ldots, C_n(M_n)\}$) may represent the spatial distortion for the audio object $o_n(i)$ when clustering it into $M_n$ cluster centroids (assuming that audio objects in one category are only allocated into clusters associated with the category in this case). The spatial distortion for the category n may be represented as:

$$D_n(M_n) = \sum_{i=0}^{O_n} dis(o_n(i), \{C_n(1), C_n(2), \ldots, C_n(M_n)\}) \quad (1)$$

where $O_n$ represents the number of audio objects in the category n, and $o_n(i)$ represents the $i^{th}$ audio object in the category n. In some embodiments, $C_n(m)$ may be the spatial position of an audio object with the $m^{th}$ largest importance in the category, and the spatial position of $C_n(m)$ may be the spatial position of that audio object. The spatial distortion dis($o_n(i)$, $\{C_n(1), C_n(2), \ldots, C_n(M_n)\}$) may be determined by a distance (or a distance squared) between the spatial position $\vec{p}_{n,i}$ of each audio object $o_n(i)$ and a reconstructed spatial position $\vec{p}_{n,i}'$ of the audio object if clustered into the $M_n$ clusters.

With the spatial distortion for each category obtained, in one embodiment, the overall spatial distortion for the categories may be determined as a weighted sum of individual spatial distortions of the categories as mentioned above. For example, the overall spatial distortion may be determined as below:

$$\text{Cost} = \sum_{n=0}^{N}(a_n D_n(M_n)) \quad (2)$$

where N represents the number of overall categories. The gain $a_n$ for each category may be predetermined and may represent the importance of the corresponding category or information to be preserved in metadata associated with the category.

In another embodiment, the overall spatial distortion for the categories may be determined as a maximum spatial distortion among individual spatial distortions of the categories. For example, the overall spatial distortion may be determined as below:

$$\text{Cost} = \max(a_0 D_0(M_0), a_1 D_1(M_1), \ldots, a_n D_n(M_n)) \quad (3)$$

In this way, the number of clusters to be assigned for each category $M_n$ may be determined based on reducing or minimizing the overall spatial distortion metric, with the constraint $$\sum_{n=0}^{N} M_n = M.$$

That is, the overall number of assigned clusters is equal to the predetermined number M.

The input audio objects are generally in one frame of an audio signal. Due to the typical dynamic nature of the audio signal and given that the audio object number changes in each category, the number of clusters assigned to each category may typically vary over time. Since the changed number of clusters for each category may cause some instability issues, a modified spatial distortion considering the cluster number consistence is utilized in the cost metric. Consequently, the cost metric may be defined as a time function. In particular, the spatial distortion for each category is further based on the difference between the number of clusters assigned to the category in the current frame and the number of clusters assigned to the category in a previous frame. In this regard, the overall spatial distortion in Equation (2) may be modified as below:

$$\text{Cost} = \sum_{n=0}^{N} (a_n f(D_n(M_n), M_n, M'_n)) \quad (4)$$

The overall spatial distortion in Equation (3) may be modified as below:

$$E_D = \sum_m g_{o,m}^2 \|\vec{P}_m - \vec{P}_o\|^2 \quad (13)$$

In Equations (4) and (5), $M_n$ represents the cluster number of the category n in the current frame, $M_n'$ represents the cluster number of the category n in the previous frame, and $f(D_n(M_n), M_n, M_n')$ represents the modified overall spatial distortion.

If the cluster number assigned to a category changes in the current frame, in comparison with the previous spatial distortion, the modified spatial distortion may be increased to prevent the change of cluster number. In one embodiment, $f(D_n(M_n), M_n, M_n')$ may be determined as below:

$$f(D_n(M_n), M_n, M'_n) = D_n(M_n) + \beta_1 * |M_n - M'_n| \quad (6)$$

where $\beta_1$ represents a parameter with a positive value. With the modified spatial distortion, there is a penalty for the cluster number change for each category. Therefore, spatial instability introduced by variation of cluster number could be alleviated.

Since a decline in the cluster number of a category is more likely to introduce spatial instability than an increase in the cluster number, in another embodiment, $f(D_n(M_n), M_n, M_n')$ may be determined as below:

$$f(D_n(M_n), M_n, M'_n) = \begin{cases} D_n(M_n) & \text{if } M_n \geq M'_n \\ D_n(M_n) * \beta_2 & \text{if } M_n < M'_n \end{cases} \quad (7)$$

where $\beta_2$ represents a parameter with a value larger than 1. In this embodiment, there is a large penalty for decreasing the cluster number, especially when the spatial distortion of the category with a decreased cluster number is large. Therefore, spatial instability introduced by the decreased cluster number can be reduced.

In the above description, with respect to the cluster assignment based on reducing the overall spatial distortion, a large amount of calculation effort may be involved in determining the optimal number of clusters for each category. To efficiently determine the cluster number for each category, in one embodiment, an iterative process is proposed. That is, the optimal cluster number of each category is estimated by maximizing the cost reduction in each iteration of cluster assignment process, so that the overall spatial distortion for the categories may be iteratively reduced or even minimized.

By iterating from 1 to the predetermined cluster number M, in each iteration, one or more clusters are assigned to a category which needs them most. Denote Cost(m−1) and Cost(m) as the overall spatial distortion in the $(m-1)^{th}$ and the $m^{th}$ iteration. In the $m^{th}$ iteration, one or more new clusters may be assigned to category n* which can reduce the overall spatial distortion most. Therefore, n* may be determined by enlarging or maximizing the reduction of the overall spatial distortion, which may be represented as below:

$$\overline{n^*} = \max_{n^*}\{\text{Cost}(m-1) - \text{Cost}(m)\} \quad (8)$$

The iterative process may be based on at least one of the difference between a spatial distortion for a category in the current iteration and in a previous iteration or an amount of a spatial distortion for a category in a previous iteration.

For the overall spatial distortion obtained by a weighted sum of all spatial distortions of the categories, the iterative process may be based on difference between a spatial distortion for a category in the current iteration and in a previous iteration. In each iteration, at least one cluster may be assigned to a category that has its spatial distortion in the current iteration become sufficiently lower (according to a first predetermined level) than its spatial distortion in the previous iteration if the category is assigned with the at least one cluster. In one embodiment, the at least one cluster may be assigned to the category having the most reduced spatial distortion if it is assigned with the at least one cluster. For example, in this embodiment, n* may be determined as below:

$$\overline{n^*} = \max_{n^*}\{D_{n^*}(M_{n^*,m-1}) - D_{n^*}(M_{n^*,m-1} + 1)\} \quad (9)$$

where $M_{n^*,m-1}$ and $D_{n^*}(M_{n^*,m-1})$ represents the cluster number and the spatial distortion for the category n* after $(m-1)^{th}$ iteration. $M_{n^*,m-1}+1$ represents the cluster number of the category n* in the $m^{th}$ iteration if in this iteration one new cluster is assigned/added to the category n*, and $D_{n^*}(M_{n^*,m-1}+1)$ represents the spatial distortion for the category n* in the $m^{th}$ iteration. It should be noted that, in each iteration, more than one new cluster may be assigned, and the category n* may be similarly determined.

For the overall spatial distortion determined as the maximum spatial distortion among all categories, the iterative process may be based on an amount of a spatial distortion for a category in a previous iteration. In each iteration, at least one cluster may be assigned to a category having a spatial distortion higher than a second predetermined level in a previous iteration. In one embodiment, the at least one cluster may be assigned to the category having the largest spatial distortion in a previous iteration. For example, in this embodiment, n* may be determined as below:

$$\overline{n}^* = \max_{n^*}\{D_{n^*}(M_{n^*,m-1})\} \qquad (10)$$

Since the category with the largest spatial distortion in the previous iteration may have its spatial distortion reduced in the current iteration (if it has one or more clusters assigned in the current iteration), the overall spatial distortion, which is determined by the largest spatial distortion among all categories, may also be reduced in the current iteration.

It is noted that the determination provided in Equations (9) and (10) may be jointly used in one iterative process. For example, in one iteration, Equation (9) may be used to assign new cluster(s) in this iteration. In another iteration, Equation (10) may be used to assign other new cluster(s).

Two ways of cluster assignment have been described above, one based on the importance of audio objects and the other based on reducing the overall spatial distortion. Additionally or alternatively, user inputs may also be used to guide the cluster assignment. As users may have different requirements for different contents for different use cases, it may largely improve the flexibility of the clustering process. In some embodiments, the cluster assignment may be further based on one or more of: a first threshold for the number of clusters to be assigned to each category, a second threshold for a spatial distortion for each category, or the importance of each category relative to other categories.

A first threshold may be predefined for the number of clusters to be assigned to each category. The first threshold may be a predetermined minimum or maximum cluster number for each category. For example, the user may specify that one category should have a certain minimum number of clusters. In this case, during the process of assignment, at least the specified number of clusters should be assigned to the category. In the case where a maximum threshold is set, at most, the specified number of clusters can be assigned to the category. The second threshold may be set to guarantee the spatial distortion for a category to be reduced to a reasonable level. The importance of each category may also be specified by the user, or may be determined based on the importance of audio objects classified in the category.

In some cases, the spatial distortion for a category may be high after the cluster assignment is done, which may introduce an audible artifact. In order to address this issue, in some embodiments, at least one audio object in a category may be reclassified into another category based on a spatial distortion for the category. In an example embodiment, if a spatial distortion of one of the categories is higher than a predetermined threshold, some audio objects in that category may be reclassified to another category, until the spatial distortion is less than (or equal to) the threshold. In some examples, audio objects may be reclassified to the category containing audio objects without information to be preserved in metadata, such as Category 0 in FIG. 2. In some embodiments where the cluster assignment is based on minimizing the overall spatial distortion in an iterative process, the object reallocation may also be an iterative process in which the audio object having the largest spatial distortion dis($o_n(i)$, $\{C_n(1), C_n(2), \ldots, C_n(M_n)\}$) in each iteration may be reclassified until the criterion of spatial distortion for the category is satisfied.

Due to the typical dynamic nature of audio signals, the importance or spatial position (and thus the spatial distortion) of audio objects changes over time. Consequently, the cluster assignment may be time variant, and then the number of clusters allocated to each category may be varied over time. In this sense, the category identification associated with a cluster m may change over time. In particular, the cluster m may represent a certain language (for example, Spanish) during a first frame, while it may change the category identification and consequently the language for a second frame (for example, English). This is in contrast with legacy, channel-based systems in which languages are statically coupled to channels rather than changing dynamically.

The cluster assignment at S102 is described above.

Referring back to FIG. 1, at S103, an audio object in each of the categories is allocated to at least one of the clusters according to the assignment.

In following description, two approaches are provided for clustering audio objects after the audio objects are classified into the categories at S101 and clusters are assigned to each category at S102.

In one approach, an audio object in each category may be allocated to at least one of the clusters assigned to one or more of the categories based on reducing a distortion cost associated with the categories. That is, due to the limit in the number of clusters assigned for each category, some leakage across clusters and categories is allowed in order to reduce the distortion cost and avoid artifacts for complex audio content. This approach may be referred to as a fuzzy category clustering. In this fuzzy category clustering approach, an audio object may be divided softly with a gain to different clusters in different categories and with a corresponding cost. During the clustering process, the distortion cost is expected to be minimal with respect to the overall spatial distortion as well as the disadvantage or mismatch of allocating an object in a category to a cluster of a different category. Therefore, there is a tradeoff between the cluster budget and the complexity of the audio content. The fuzzy category clustering approach may be suitable for audio objects with metadata such as zone mask and snap, since no strict separation with other metadata is required for them. The fuzzy category clustering approach may be described in the manner set forth below.

In the fuzzy category clustering approach, the cluster number assigned to each category may be determined at S102 based on the importance of audio object or based on minimizing the overall spatial distortion. For the importance-based cluster assignment, there may be some categories without any cluster assigned. In these cases, the fuzzy category clustering approach may be applied when clustering audio objects since an object may be softly clustered into a cluster/clusters of other categories. It should be noted that there may not be a necessary correlation between the approaches applied in the step of cluster assignment and the approaches applied in the step of audio object clustering.

In the fuzzy category clustering approach, the distortion cost may be represented as a cost function which is associated with one or more of: (1) an original spatial position of each audio object $\vec{p}_o$, (2) identification of a category $n_o$ to which each audio object is classified, (3) a spatial position of each cluster $\vec{p}_m$, or more specifically, the spatial position of the cluster(s) to which the audio object will be allocated, or (4) identification of a category $n_m$ associated with each cluster. In one example, the clustered audio object of a cluster may be determined by all input audio objects distributed over it using a gain $g_{o,m}$, which may be represented as below:

$$y_m = \sum_{o=1}^{o=O} g_{o,m} x_o \quad (11)$$

where O represents the number of input audio objects, $y_m$ represents the clustered audio object of the $M^{th}$ cluster, $x_o$ represents the $o^{th}$ input audio object, and the gain $g_{o,m}$ may be represented as $g_{o,m}=F(\vec{p}_o,n_o,\vec{p}_m,n_m)$. For example, as shown in FIG. 2, an audio object in Category 1 may be clustered into all eleven clusters with corresponding gains, regardless of categories to which the clusters are assigned.

In some embodiments, the gain $g_{o,m}$ may be determined by minimizing the cost function which is associated with one or more of $\vec{p}_o$, $n_o$, $\vec{p}_m$, or $n_m$. The cost function may be based on a distance between the original spatial position $\vec{p}_o$ of each audio object and a spatial position of a cluster $\vec{p}_m$ to which the audio object is allocated. $\vec{p}_m$, as discussed above, may be determined as the spatial position of the audio object with the greatest importance within the $m^{th}$ category. For example, it is desired that the distance between $\vec{p}_o$ and $\vec{p}_m$ is as small as possible. Alternatively or additionally, the cost function may also be associated with a mismatch between the identification of a category $n_o$ to which each audio object is classified and the identification of a category $n_m$ associated with a cluster to which the audio object is allocated. Generally, an audio object is desired to be clustered within the same category, and then the cost may be small.

In some embodiments, the cost function may be represented as cumulative contributions using second-order polynomials in $\vec{p}_o$, $n_o$, $\vec{p}_m$, and $n_m$, and then the global minimum value may be determined from the cost function as the gain $g_{o,m}$. The detailed discussion may be provided in the manner set forth below.

The cost function may be typically minimized subject to a certain additional criterion. In allocating audio signals, one criterion may be to maintain the summed amplitude or energy of an input audio object, for example, $$\forall_{o \in O} \sum_{m=1}^{M} (g_{o,m})^\alpha = 1 \quad (12)$$

where $\alpha$ may be a value between 1 and 2. For any audio object o, the gain $g_{o,m}$ corresponding all M clusters may be subject to the above equation.

In the following, the cost function E may be discussed. By minimizing the cost function, the gain $g_{o,m}$ may be determined.

The cost function, as mentioned above, may be associated with the distance between $\vec{p}_o$ and $\vec{p}_m$, which may be regarded as a first term $E_D$ in the cost function, and may be determined as:

$$E_D = \sum_m g_{o,m}^2 \|\vec{p}_m - \vec{p}_o\|^2 \quad (13)$$

The cost function may also be associated with a mismatch between $n_o$ and $n_m$, which may be regarded as a second term $E_C$ in the cost function. $E_C$ may represent the cost of clustering an audio object across a cluster within a different category and may be determined as:

$$E_C = \sum_m g_{o,m}^2 (n_m != n_0) \quad (14)$$

where $n_m != n_0$ may be determined as $$\bar{\delta} = \begin{cases} 0, & \text{if } n_m = n_o \\ 1, & \text{if } n_m \neq n_o \end{cases} \quad (15)$$

As mentioned above, when minimizing the cost function, one criterion is to maintain the summed amplitude or energy of an input audio object. Therefore, the cost function may also be associated with the gain or loss of energy; that is, a deviation from the sum of gains for a specific audio object and +1. The deviation may be regarded as a third term $E_N$ in the cost function, which may be determined as:

$$E_N = (1 - \sum_m g_{o,m}^2)^2 \quad (16)$$

Furthermore, the cost function may be based on a distance between the original spatial position of each audio object $\vec{p}_o$ and a reconstructed spatial position of the audio object $\vec{p}_o{}'$. The reconstructed spatial position $\vec{p}_o{}'$ may be determined according to the spatial position of a cluster $\vec{p}_m$ to which the audio object is clustered with the gain $g_{o,m}$. For example, $\vec{p}_o{}'$ may be determined as below:

$$\vec{p}_o{}' = \sum_m g_{o,m} \vec{p}_m \quad (17)$$

The distance between $\vec{p}_o$ and $\vec{p}_o{}'$ may be regarded as the fourth term $E_P$ in the cost function and may be represented as below:

$$E_P = \left\| \vec{p}_o' - \vec{p}_o \sum_m g_{o,m} \right\|^2 = \left\| \sum_m g_{o,m} \vec{p}_m - \vec{p}_o \sum_m g_{o,m} \right\|^2 \quad (18)$$

According to the first, second, third, and fourth terms, the cost function may be represented as a weighted sum of those terms and may be represented as below:

$$E = w_D E_D + w_C E_C + w_N E_N + w_P E_P \quad (18)$$

where the weights $w_D$, $w_C$, $w_N$, and $w_P$ may represent the importance of different terms in the cost function.

Based on the four terms in the cost function, the gain $g_{o,m}$ may be determined. An example of calculation for the gain $g_{o,m}$ is given below. It should be noted that, other methods of calculation are also possible.

The gain $g_{o,m}$ of the $o^{th}$ audio object for M clusters may be written as a vector:

$$\vec{g}_o = \begin{bmatrix} g_{o,1} \\ M \\ g_{o,M} \end{bmatrix} \quad (20)$$

The spatial positions of the M clusters may be written as a matrix:

$$P_M = \begin{bmatrix} \vec{p}_1 \\ M \\ \vec{p}_M \end{bmatrix} \quad (21)$$

A matrix for the original spatial positions of the audio object may also be constructed as:

$$P_O = \begin{bmatrix} \vec{p}_o \\ M \\ \vec{p}_o \end{bmatrix} \quad (22)$$

The first term $E_D$ representing the distance between the original spatial position and the reconstructed spatial position of an audio object may be reformulated as below:

$$E_D = \sum_m g_{o,m}^2 \|\vec{p}_m - \vec{p}_o\|^2 = \vec{g}_o^T \Lambda_D \vec{g}_o \quad (23)$$

where $\Lambda_D$ represents a diagonal matrix with diagonal elements $\lambda_{mm} = \vec{p}_m - \vec{p}_o^2$.

The second term $E_C$ representing a mismatch between $n_o$ and $n_m$ of an audio object may be reformulated as below:

$$E_C = \sum_m g_{o,m}^2 (n_m != n_o) = \vec{g}_o^T \Lambda_C \vec{g}_o \quad (24)$$

where $\Lambda_C$ represents a diagonal matrix with diagonal elements $\lambda_{mm} = (n_m != n_o)$.

The third term $E_N$ representing the deviation the sum of gains for an audio object and +1 may be reformulated as below:

$$E_N = \left(1 - \sum_m g_{o,m}^2\right)^2 = 1 - 2J_{1,M} + \vec{g}_o + \vec{g}_o^T J_{N,M} \vec{g}_o \quad (25)$$

where $J_{N,M}$ represents all-ones matrix with dimensions (N, M).

The fourth term $E_P$ representing the distance between the original spatial position and the reconstructed spatial position of an audio object may be reformulated as below:

$$E_P = \left\| \sum_m g_{o,m} \vec{p}_m - \sum_m g_{o,m} \vec{p}_o \right\|^2 = \quad (26)$$

$$\left\| \vec{g}_o^T P_M - \vec{g}_o^T P_O \right\|^2 = \left(\vec{g}_o^T P_M - \vec{g}_o^T P_O\right)\left(\vec{g}_o^T P_M - \vec{g}_o^T P_O\right)^T$$

By combining the above Equations (23)-(26) together, the cost function may be represented as set forth below:

$$E = \vec{g}_o^T A \vec{g}_o + B \vec{g}_o + C \quad (27)$$

with $$A = \quad (28)$$
$$w_P(P_M P_M^T - P_M P_O^T - P_O P_M^T + P_O P_O^T) + w_D \Lambda_D + w_N J_{M,M} + w_C \Lambda_C$$

$$B = -2 w_N J_{1,M} \quad (29)$$

$$C = w_N \quad (30)$$

As discussed above, it is desirable to obtain a minimum in the cost function, which may be determined by:

$$\frac{\partial}{\partial \vec{g}} E = 0 \quad (31)$$

giving $$(A + A^T)\vec{g}_o + B^T = 0 \quad (32)$$

Finally, the vector $\overset{u}{\vec{g}_o}$ may be determined as below:

$$\vec{g}_o = -(A + A^T)^{-1} B^T \quad (33)$$

By calculating the above equation, the gains for the $o^{th}$ audio object among the M clusters may be determined.

The $o^{th}$ audio object may be clustered into M clusters with the determined gain vector $\vec{g}_o$. It can be appreciated that, depending on the determined gain vector, an audio object may be clustered into only one cluster of one category where it is classified or of a different category, or may be clustered in to multiple clusters of one category where it is classified or of multiple different categories.

The reconstructed spatial position of an audio object may be obtained by the Equation (17) when the gain vector $\vec{g}_o$ is determined. In this regard, the process of determining the gains may also be applied in the cluster assignment based on minimizing the overall spatial distortion as described above so as to determine the reconstructed spatial position and thus the spatial position of each category.

It should be noted that the second-order polynomial is used as an example to determine the minimum in the cost function. Many other exponential values, for example, 1, 1.5, 3, and the like may also be used in other example embodiments.

The fuzzy category clustering approach for audio object clustering is described above. In another approach, an audio object in each category may be allocated to at least one of clusters that are assigned to the category, based on reducing a spatial distortion cost associated with the category. That is, no leakage across categories is allowed. The audio object clustering is performed within each category and an audio object may not be grouped into a cluster assigned to another category. This approach may be referred to as a hard category clustering approach. In some embodiments where the approach is applied, an audio object may be allocated to more than one of the clusters assigned to the category corresponding to the audio object. In a further embodiment, no leakage across clusters is allowed in audio object clustering and an audio object may be allocated to only one of the clusters assigned to the corresponding category.

The hard category clustering approach may be suitable for some specific applications, such as dialog replacement or dialog enhancement, which require the audio objects (dialog objects) to be separated with others.

In the hard category clustering approach, since an audio object in one category may not be clustered into one or more clusters of other categories, it is expected that in the previous cluster assignment, at least one cluster is assigned to each category. For this purpose, the cluster assignment by minimizing the overall spatial distortion described above may be more suitable in some embodiments. In other embodiments, the importance-based cluster assignment may also be used when hard category clustering is applied. Some additional conditions may be used in the cluster assignment to ensure that each category has at least one cluster assigned, as discussed above. For example, a minimum threshold of cluster or a minimum threshold of spatial distortion for each category may be utilized.

Within the category, the audio object, in one or more example embodiments may be clustered in only one cluster or in multiple clusters since the category represents the same kind of metadata. For example, as shown in FIG. 2, an audio object in Category 1 may be clustered into one or more of Clusters 4, 5, or 6. In a scenario where an audio object is clustered into multiple clusters within one category, corresponding gains may also be determined to reduce or even minimize the distortion cost associated with the category (which may be similar to what is described with respect to the fuzzy category clustering approach). The difference lies in that the determination is performed within one category. In some embodiments, each input audio object may be allowed to be clustered to only one cluster assigned to its category.

Two approaches for audio clustering are discussed above. It should be noted that the two approaches may be utilized separately or in combination. For example, after audio object classification at S101 and cluster assignment at S102, for some of the categories, the fuzzy category clustering approach may be applied to cluster audio objects within them; and for the remaining categories, the hard category clustering approach may be applied. That is, some leakage across categories may be allowable within some categories and no leakage across categories is allowable for other categories.

After input audio objects are allocated to the clusters, for each cluster, audio objects may be combined to obtain a clustered audio object, and the metadata of audio objects in each cluster may be combined to obtain the metadata of the clustered audio object. The clustered audio object may be a weighed sum of all audio objects in the cluster with corresponding gains. The metadata of the clustered audio object may be the corresponding metadata representing by the category in some examples, or may be metadata of any audio object or the most important audio object among the cluster or its category in other examples.

Since all input audio objects are classified into corresponding categories depending on their information to be preserved in metadata before audio object clustering, different metadata to be preserved or a unique combination of metadata to be preserved is associated with a different category. After clustering, for an audio object within one category, it is less possible that it is mixed with audio objects associated with different metadata. In this regard, the metadata of an audio object can be preserved after clustering. Furthermore, during the cluster assignment and audio object allocation process, the spatial distortion or distortion cost is considered.

Figure 3:
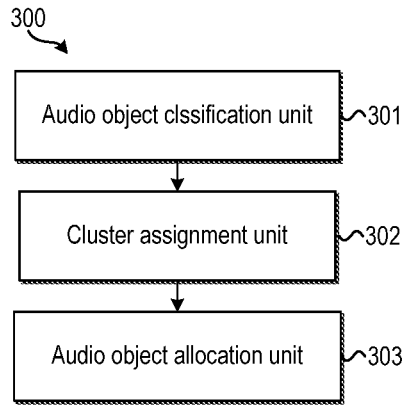
FIG. 3 illustrates a block diagram of a system for metadata-preserved audio object clustering in accordance with an example embodiment.

FIG. 3 depicts a block diagram of a system 300 for metadata-preserved audio object clustering in accordance with one example embodiment. As depicted in FIG. 3, the system 300 comprises an audio object classification unit 301 configured to classify a plurality of audio objects into a number of categories based on information to be preserved in metadata associated with the plurality of audio objects. The system 300 further comprises a cluster assignment unit 302 configured to assign a predetermined number of clusters to the categories, and an audio object allocation unit 303 configured to allocate an audio object in each of the categories to at least one of the clusters according to the assigning.

In some embodiments, the information may include one or more of size information, zone mask information, snap information, type of content, or a rendering mode of an audio object.

In some embodiments, the audio object classification unit 301 may be further configured to classify an audio object without the information to be preserved into one category; and classify an audio object with different information to be preserved into a different category.

In some embodiments, the cluster assignment unit 302 may further comprise: an importance based determination unit configured to determine the predetermined number of audio objects from the plurality of audio objects based on an importance of each audio object relative to other audio objects; and a distribution determination unit configured to determine distribution of the predetermined number of audio objects among the categories. In these embodiments, the cluster assignment unit 302 may be further configured to assign the predetermined number of clusters to the categories according to the distribution.

In some embodiments, the cluster assignment unit 302 may be further configured to assign the predetermined number of clusters to the categories based on reducing an overall spatial distortion for the categories.

In some embodiments, the overall spatial distortion for the categories may include a maximum spatial distortion among individual spatial distortions of the categories, or a weighted sum of individual spatial distortions of the categories. A spatial distortion for each category may be associated with an original spatial position of each audio object in the category and a spatial position of at least one of the clusters.

In some embodiments, a reconstructed spatial position of each audio object may be determined based on the spatial position of the at least one cluster, and the spatial distortion for each category may be determined based on a distance between the original spatial position of each audio object in the category and the reconstructed spatial position of the audio object.

In some embodiments, the plurality of audio objects may be in one frame of an audio signal, and a spatial distortion for each category may be further based on difference between the number of clusters assigned to the category in current frame and the number of clusters assigned to the category in a previous frame.

In some embodiments, the cluster assignment unit 302 may be further configured to iteratively reduce the overall spatial distortion for the categories based on at least one of the following: an amount of a spatial distortion for a category in a previous iteration, or difference between a spatial distortion for a category in current iteration and in a previous iteration.

In some embodiments, the cluster assignment unit 302 may be further configured to assign the predetermined number of clusters to the categories based on one or more of the following: a first threshold for the number of clusters to be assigned to each category, a second threshold for a spatial distortion for each category, or an importance of each category relative to other categories.

In some embodiments, the system 300 may further comprise an audio object reclassification unit configured to reclassify at least one audio object in a category into another category based on a spatial distortion for the category.

In some embodiments, the audio object allocation unit 303 may be further configured to allocate an audio object in each category to at least one of the clusters assigned to the category based on reducing a distortion cost associated with the category.

In some embodiments, the audio object allocation unit 303 may be further configured to allocate an audio object in each category to at least one of the clusters assigned to one or more of the categories based on reducing a distortion cost associated with the categories.

In some embodiments, the distortion cost may be associated with one or more of an original spatial position of each audio object, a spatial position of the at least one cluster, identification of a category to which each audio object is classified, or identification of each category to which the at least one cluster is assigned.

In some embodiments, the distortion cost may be determined based on one or more of the following: a distance between the original spatial position of each audio object and the spatial position of the at least one cluster, a distance between the original spatial position of each audio object and a reconstructed spatial position of the audio object determined based on the spatial position of the at least one cluster, or a mismatch between the identification of the category to which each audio object is classified and the identification of each category to which the at least one cluster is assigned.

In some embodiments, the system 300 may further comprise an audio object combining unit configure to combine audio objects in each cluster to obtain a clustered audio object and a metadata combining unit configure to combine metadata of audio objects in each cluster to obtain metadata of the clustered audio object.

For the sake of clarity, some additional components of the system 300 are not depicted in FIG. 3. However, it should be appreciated that the features as described above with reference to FIG. 1 are all applicable to the system 300. Moreover, the components of the system 300 may be a hardware module or a software unit module and the like. For example, in some embodiments, the system 300 may be implemented partially or completely with software and/or firmware, for example, implemented as a computer program product embodied in a computer readable medium. Alternatively or additionally, the system 300 may be implemented partially or completely based on hardware, for example, as an integrated circuit (IC), an application-specific integrated circuit (ASIC), a system on chip (SOC), a field programmable gate array (FPGA), and so forth. The scope of the example embodiments are not limited in this regard.

Figure 4:
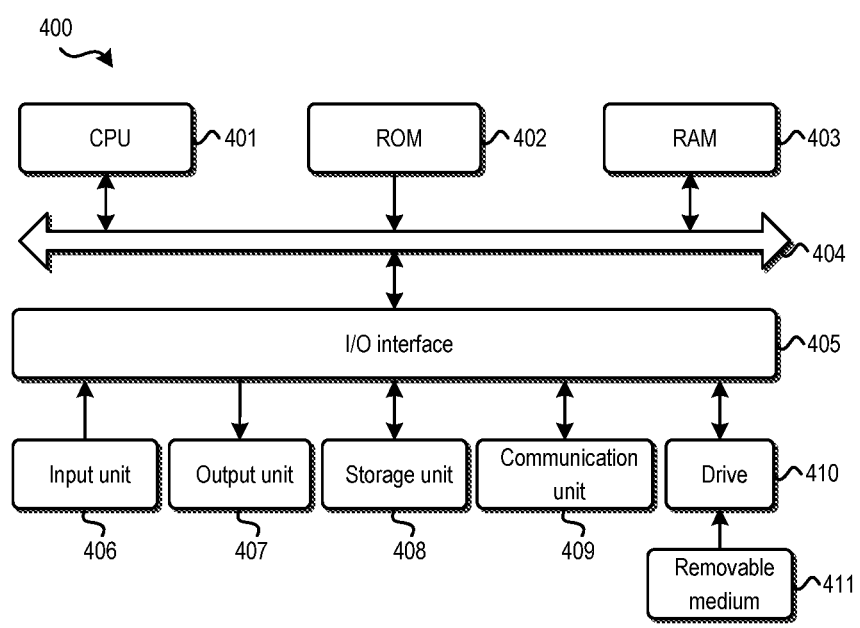
FIG. 4 illustrates a block diagram of an example computer system suitable for implementing embodiments.

FIG. 4 depicts a block diagram of an example computer system 400 suitable for implementing embodiments. As shown, the computer system 400 comprises a central processing unit (CPU) 401 which is capable of performing various processes in accordance with a program stored in a read only memory (ROM) 402 or a program loaded from a storage section 408 to a random access memory (RAM) 403. In the RAM 403, the data required when the CPU 401 performs the various processes or the like is also stored as required. The CPU 401, the ROM 402 and the RAM 403 are connected to one another via a bus 404. An input/output (I/O) interface 405 is also connected to the bus 404.

The following components are connected to the I/O interface 405: an input section 406 including a keyboard, a mouse, or the like; an output section 407 including a display such as a cathode ray tube (CRT), a liquid crystal display (LCD), or the like, and a loudspeaker or the like; the storage section 408 including a hard disk or the like; and a communication section 409 including a network interface card such as a LAN card, a modem, or the like. The communication section 409 performs a communication process via the network such as the internet. A drive 410 is also connected to the I/O interface 405 as required. A removable medium 411, such as a magnetic disk, an optical disk, a magneto-optical disk, a semiconductor memory, or the like, is mounted on the drive 410 as required, so that a computer program read therefrom is installed into the storage section 408 as required.

Specifically, in accordance with example embodiments disclosed herein, the processes described above with reference to FIG. 1 may be implemented as computer software programs. For example, embodiments of the example embodiments include a computer program product including a computer program tangibly embodied on a machine readable medium, the computer program including program code for performing method 100. In such embodiments, the computer program may be downloaded and mounted from the network via the communication section 409, and/or installed from the removable medium 411.

Generally speaking, various example embodiments may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from the operation of computer program code, and/or as a plurality of coupled logic circuit elements constructed to carry out the associated function(s). For example, embodiments may include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the example embodiments may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may be executed entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. Further, it is well known to the skilled person that communication media typically embodies computer readable instructions, data structures, program modules or other data in a modulated data signal such as a carrier wave or other transport mechanism and includes any information delivery media.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any what may be claimed, but rather as descriptions of features that may be specific to particular example embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications and adaptations to the foregoing example embodiments of may become apparent to those skilled in the relevant arts in view of the foregoing description, when it is read in conjunction with the accompanying drawings. Any and all modifications will still fall within the scope of the non-limiting and example embodiments. Furthermore, other example embodiments set forth herein will come to mind to one skilled in the art to which these embodiments pertain having the benefit of the teachings presented in the foregoing descriptions and the drawings.

Accordingly, the example embodiments disclosed herein may be embodied in any of the forms described herein. For example, the following enumerated example embodiments (EEEs) describe some structures, features, and functionalities of some aspects of the example embodiments disclosed herein.

EEE 1. A method to preserve object metadata in audio object clustering, including: allocating audio objects into categories, with each category representing one or a unique combination of metadata that requires preservation; generating a number of clusters for each category through a clustering process, subject to an overall (maximum) number of available clusters and an overall error criterion, and the method further comprises: a fuzzy object category separation, or a hard object category separation.

EEE 2. The method according to EEE 1, wherein the fuzzy object category separation comprises: determining output cluster centroids, for example, by selecting the most important objects, and generating the output cluster signals, by minimizing a cost function which jointly considers (1) the positional metadata of each object $\vec{p}_o$, (2) the category identification of each object $n_o$, (3) the positional metadata of each cluster $\vec{p}_m$, and (4) the category identification associated with each cluster $n_m$.

EEE 3. The method according to EEE 2, wherein the cost function considers a cost associated with a mismatch between the object category identification $n_o$ and the cluster category identification $n_m$;

EEE 4. The method according to EEE 1, wherein the hard object category separation comprises: determining an optimal cluster number for each category by minimizing the overall spatial distortion, and clustering objects within each category, the clustering process is performed for each category independently.

EEE 5. The method according to EEE 4, wherein the overall spatial distortion comprises: a spatial distortion in each category measuring difference between the original object position and the position after clustering, the importance of each category, and the cluster number change of each category.

EEE 6. The method according to EEE 4, the process of determining the optimal cluster number for each category is an iterative process, and a cluster is added or assigned to the category which needs it most in each iteration.

EEE 7. The method according to EEE 4, the process of determining the optimal cluster number further comprises object reallocation in order to avoid large spatial distortion in one category.

It will be appreciated that the embodiments of the example embodiments disclosed herein are not to be limited to the specific embodiments disclosed and that modifications and other embodiments are intended to be included within the scope of the appended claims. Although specific terms are used herein, they are used in a generic and descriptive sense only, and not for purposes of limitation.

What is claimed is:

1. A method for decoding an encoded audio signal, comprising:
   receiving the encoded audio signal and determining an audio object from the encoded audio signal;
   classifying the audio object into at least one category based on rendering mode information, wherein the rendering mode information is part of metadata associated with the audio object;
   computing a spatial distortion metric for the at least one category based on the rendering mode information;
   assigning a number of clusters to the at least one category based on the spatial distortion metric;
   determining at least one cluster for the at least one category based on the metadata and the assigned number of clusters; and
   rendering the audio object based on the rendering mode information for the at least one cluster.

2. A non-transitory, computer-readable storage medium having instructions stored thereon, that when executed by one or more processors, cause the one or more processors to perform operations comprising:
   receiving an encoded audio signal and determining an audio object from the encoded audio signal;
   classifying the audio object into at least one category based on rendering mode information, wherein the rendering mode information is part of metadata associated with the audio object;
   computing a spatial distortion metric for the at least one category based on the rendering mode information;
   assigning a number of clusters to the at least one category based on the spatial distortion metric;
   determining at least one cluster for the at least one category based on the metadata and the assigned number of clusters; and
   rendering the audio object based on the rendering mode information for the at least one cluster.

3. A system for decoding an encoded audio signal, comprising:
   a receiver for receiving the encoded audio signal and determining an audio object from the encoded audio signal;
   an audio object classification unit for classifying the audio object into at least one category based on rendering mode information, wherein the rendering mode information is part of metadata associated with the audio object;
   a cluster assignment unit for computing a spatial distortion metric for the at least one category based on the rendering mode information, assigning a number of clusters to the at least one category based on the spatial distortion metric; and determining, for the at least one category, at least one cluster based on the metadata and the assigned number of clusters; and
   a renderer for rendering the audio object based on the rendering mode information for the at least one cluster.

* * * * *